(12) United States Patent
Lim et al.

(10) Patent No.: US 10,980,068 B2
(45) Date of Patent: Apr. 13, 2021

(54) ESTABLISHMENT OF RANDOM ACCESS CHANNEL COMMUNICATIONS

(71) Applicant: Apple Inc., Cupertino, CA (US)

(72) Inventors: Seau S. Lim, Swindon (GB); Candy Yiu, Portland, OR (US); Marta Martinez Tarradell, Hillsboro, OR (US); Sudeep K. Palat, Cheltenham (GB); Daewon Lee, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/476,180

(22) PCT Filed: Jan. 5, 2018

(86) PCT No.: PCT/US2018/012685
§ 371 (c)(1),
(2) Date: Jul. 5, 2019

(87) PCT Pub. No.: WO2018/129394
PCT Pub. Date: Jul. 12, 2018

(65) Prior Publication Data
US 2019/0357272 A1  Nov. 21, 2019

Related U.S. Application Data

(60) Provisional application No. 62/443,345, filed on Jan. 6, 2017, provisional application No. 62/443,571, filed on Jan. 6, 2017.

(51) Int. Cl.
*H04W 74/08* (2009.01)
*H04W 76/19* (2018.01)
(Continued)

(52) U.S. Cl.
CPC ....... *H04W 74/0841* (2013.01); *H04W 68/02* (2013.01); *H04W 76/19* (2018.02); *H04W 76/27* (2018.02)

(58) Field of Classification Search
None
See application file for complete search history.

(56) References Cited

U.S. PATENT DOCUMENTS

2016/0219624 A1* 7/2016 Lin ..................... H04W 74/085
2017/0251499 A1* 8/2017 Radulescu .......... H04L 41/0866
(Continued)

OTHER PUBLICATIONS

3GPP TSG-RAN2 #96 Nov. 14-18, 2016 R2-167588 Huawei "Discussion on 2-step RACH Procedure" (Year: 2016).*
(Continued)

*Primary Examiner* — Jeffrey M Rutkowski
*Assistant Examiner* — Basil Ma
(74) *Attorney, Agent, or Firm* — Kilpatrick Townsend & Stockton LLP

(57) ABSTRACT

Embodiments are generally directed to establishment of random access channel communications. An embodiment of an apparatus for a user equipment (UE) to perform a random access (RACH) procedure, the apparatus including one or more baseband processors to generate a first Radio Resource Control (RRC) RACH procedure message to transmit to an Evolved Node B (eNB) or Next Generation Node B (gNB), the first RRC RACH procedure message including a UE identification (ID) and a request message with scheduled transmission content data, the UE ID being a common UE ID for RACH procedures between the UE and the eNB or gNB, and process a second RRC RACH procedure message received from the eNB or gNB, the second RRC RACH procedure message including contention resolution data for a random access preamble and the request message; and a memory to store data for the RACH procedure.

20 Claims, 10 Drawing Sheets

(51) Int. Cl.
　　　*H04W 76/27*　　　(2018.01)
　　　*H04W 68/02*　　　(2009.01)

(56) References Cited

U.S. PATENT DOCUMENTS

2018/0110074 A1* 4/2018 Akkarakaran .... H04W 72/0413
2019/0349837 A1* 11/2019 Shih ........................ H04W 8/08
2020/0214070 A1* 7/2020 Ingale ................... H04W 12/06

OTHER PUBLICATIONS

3GPP TSG-RAN2 #96 Nov. 14-18, 2016 R2-168520 Intel "2-step random access procedure in NR" (Year: 2016).*
International Search Report and Written Opinion received for International Application No. PCT/US2018/012685 dated May 25, 2018, 12 pages.
Huawei Hisilicon: "Discussion on 2-step RACH Procedure", 3GPP DRAFTt; R2-167588, 3rd Generation Partnership Project (3GPP, Mobile Competence Centre ; France, vol. RAN WG2, No. Reno, USA; Nov. 13, 2016, XP05117741i5, Retrieved from the Internet: URL:http:/www.3gpp.org/ftp/Meetings_3GPP_SYNC/RAN2/Docs/, 3 pages.
Interdigital Communications: "Random Access Procedure in NR" , 3GPP DRAFT, R2-168465 RA Procedure, 3rd Generation Partnership Project (3GPP), Mobile Competence Centre; France, vol. RAN WG2, No. Reno, USA; Nov. 13, 2016, XP051178055, Retrieved from the Internet: URL:http://www.3gpp.org/ tp/Meetings_3GPP_SYNC/RAN2/Docs/, 3 pages.
Qualcomm Incorporated et al: "EU-ID for data transmission in RRC_Inactive", 3GPP; R2-168608 NR, UE-ID for Data Transmission and Paging in RRC Inactive, 3rd Generation Partnership Project (3GPP), Mobile Competence Centre; France, vol. RAN WG2, No. Reno, US; Nov. 5, 2016; XP051193122, Retrieved from the Internet: URL:http://www.3gpp.org/ftp/tsg_ran/WG2_RL2/TSGR2_96/Docs/, 2 pages.
Intel Corporation "2-Step random access procedure in NR", 3GPP DRAFT; R2-1 168520_5G_2-STEPRAV00, 3rd Generation Partnershp Project (3GPP), Mobile Competence Centre; France, WG2, Reno, Nevada , USA; Nov. 13, 2016, XP05177455, pp. 1-6.
3rd Generation Partnership Project; Technical Specification Group Radio Access Network; Evolved Universal Terrestrial Radio Access (E-UTRA); Physical channels and modulation (Release 14) 3GPP TS 36.211 V14.1.0 (Dec. 2016) 7 pages.
3rd Generation Partnership Project; Technical Specification Group Radio Access Network; Evolved Universal Terrestrial Radio Access (E-UTRA); Physical channels and modulation (Release 14) 3GPP TS 36.211 V14.1.0 (Dec. 2016), Forward, pp. 8-61.
3rd Generation Partnership Project; Technical Specification Group Radio Access Network; Evolved Universal Terrestrial Radio Access (E-UTRA); Physical channels and modulation (Release 14) 3GPP TS 36.211 V14.1.0 (Dec. 2016), Downlink, pp. 69-139.
3rd Generation Partnership Project; Technical Specification Group Radio Access Network; Evolved Universal Terrestrial Radio Access (E-UTRA); Physical channels and modulation (Release 14) 3GPP TS 36.211 V14.1.0 (Dec. 2016), Sidelink ,pp. 140-175.
ETSI TS 134 V13.3.0 (Oct. 2016) LTE Evolved Universal Terrestrial Radio Access (E-UTRA); User Equipment (UE) procedures in idle mode (3GPP TS 36.304 version 1.3.0 Release 13) 48 pages.
Touray, Almamy (Dec. 2009) LTE: Der Mobilfunk der Zukunft Random Access, Ausgewahlte Kapitel der Nachrichtentechnik, WS 2009/2010, Seminar, 12 pages.
3rd Generation Partnership Project; Technical Specification Group Radio Access Network; Evolved Universal Terrestrial Radio Access (E-UTRA) and Evolved Universal Terrestrial Radio Access Network (E-UTRAN);Overall description; Stage 2 (Release 14), 3GPP TS 3GPP TS 36.300 V14.1.0, http://www.3gpp.org, Dec. 2016, 316 pages.
3rd Generation Partnership Project; Technical Specification Group Radio Access Network; Evolved Universal Terrestrial Radio Access (E-UTRA); Medium Access Control (MAC) Protocol Specification (Release 14), 3GPP TS 36.321 V14.1.0, http://www.3gpp.org, Dec. 2016, 98 pages.
3rd Generation Partnership Project; Technical Specification Group Radio Access Network; Evolved Universal Terrestrial Radio Access (E-UTRA); Physical Channels and Modulation (Release 14), 3GPP TS 36.211 V14.1.0, http://www.3gpp.org, Dec. 2016, 176 pages.
3rd Generation Partnership Project; Technical Specification Group Radio Access Network; Evolved Universal Terrestrial Radio Access (E-UTRA); Physical layer procedures (Release 14), 3GPP TS 36.213 V14.1.0, http://www.3gpp.org, Dec. 2016, 414 pages.

* cited by examiner

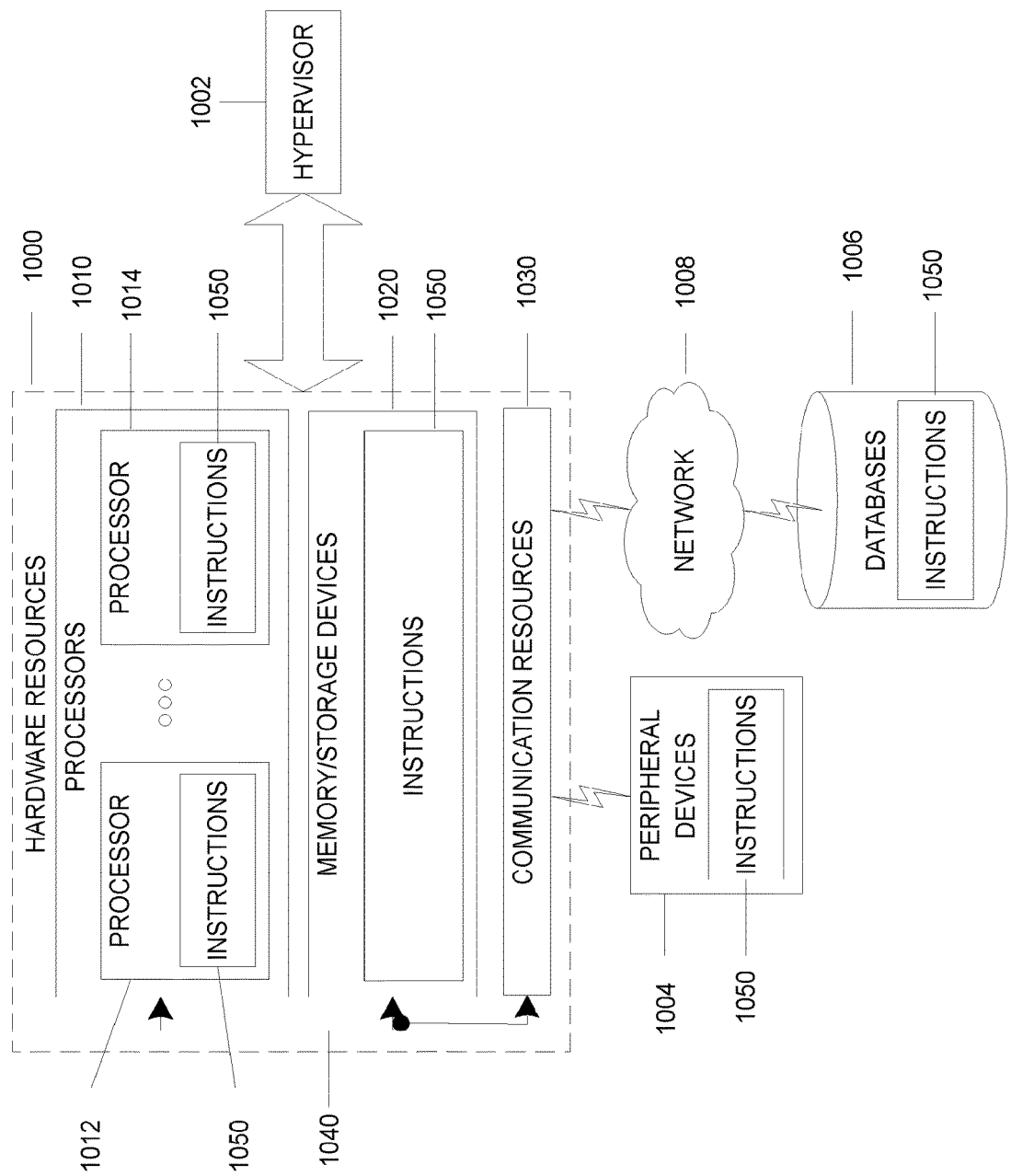

ESTABLISHMENT OF RANDOM ACCESS CHANNEL COMMUNICATIONS

RELATED APPLICATION

This application claims the benefit under 35 USC 119(e) of U.S. Provisional Patent Application No. 62/443,345 filed Jan. 6, 2017 and U.S. Provisional Patent Application No. 62/443,571 filed Jan. 6, 2017, which applications are incorporated herein by reference as if fully set forth.

TECHNICAL FIELD

Embodiments described herein generally relate to the field of communications and, more particularly, establishment of random access channel communications.

BACKGROUND

In the operation of a User Equipment (UE) in a 3GPP Long-Term Evolution (LTE) network, certain communications with a Base Station (an Evolved Node B (eNB) or Next Generation Node B (gNB)) utilize a random access channel (RACH), which is a shared channel used by wireless terminals to access the network.

Because the RACH is a shared channel, multiple UEs may attempt to access the channel at the same time, which may result in collisions of signals at the base station. The signal collisions may require a contention resolution procedure at the Base Station.

A conventional RACH procedure is a procedure including a series of four communications between the UE and the eNB or gNB. However, the RACH procedure communications vary depending on circumstances, thus complicating random access operations.

BRIEF DESCRIPTION OF THE DRAWINGS

Embodiments described here are illustrated by way of example, and not by way of limitation, in the figures of the accompanying drawings in which like reference numerals refer to similar elements.

FIG. 10 is a block diagram illustrating components, according to some example embodiments, able to read instructions from a machine-readable or computer-readable medium and perform one or more methodologies.

DETAILED DESCRIPTION

Embodiments described herein are generally directed to establishment of random access channel communications.

In Long-Term Evolution (LTE) communications, a random access procedure for a Random Access Channel (RACH) is performed for initial access and for any scenarios where a User Equipment (UE) has no direct or dedicated means of communicating with the base station (such as an Evolved Node B (eNB) or Next Generation (gNB)), for when there is no dedicated Scheduling Request (SR), when the Uplink (UL) is not time-aligned and there is available Downlink (DL)/UL data, or when handover to a new target cell is not synchronized with the previous cell.

Random access communication may include operations performed pursuant to 3GPP (3rd Generation Partnership Project) TS (Technical Specification) 36.321 (Group Radio Access Network; Evolved Universal Terrestrial Radio Access (E-UTRA); Medium Access Control (MAC) protocol specification); and 3GPP TS 36.331 (Group Radio Access Network; Evolved Universal Terrestrial Radio Access (E-UTRA); Radio Resource Control (RRC); Protocol specification).

It is anticipated that these scenarios or similar scenarios will still be applicable for random access in Fifth Generation (5G) NR (New Radio) network communications. In addition, for 5G NR, random access may also be used for small data transmission. Further, in Release 14 (Rel-14) Light Connection and in 5G NR, random access may also be initiated to perform area update for Radio Access Network (RAN) paging. For these reasons, the conventional process for establishing random access communications will likely continue to create inefficiencies in User Equipment and Base Station operations.

Figure 1:
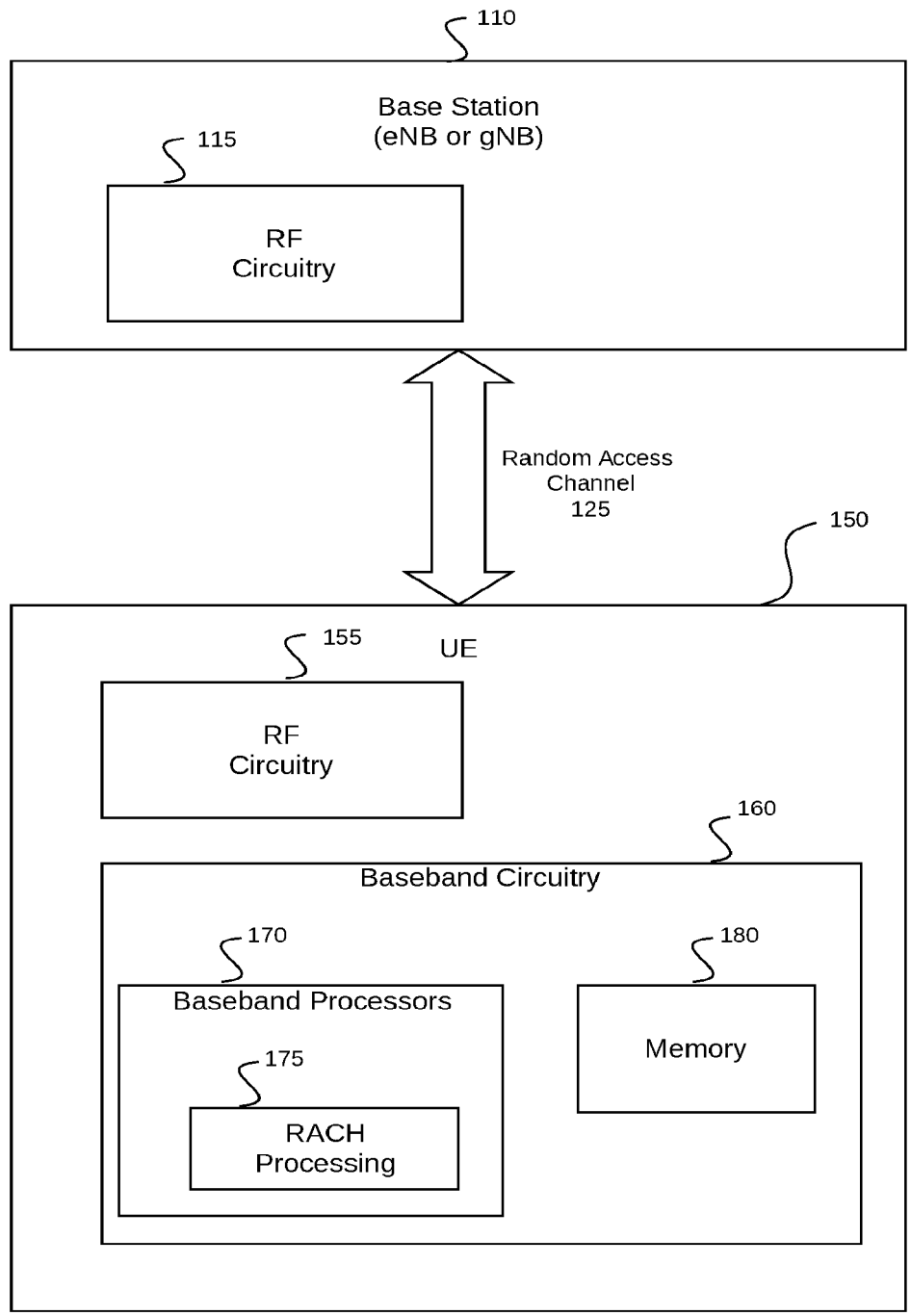
FIG. 1 is an illustration of an apparatus for performing Random Access Channel communications according to some embodiments.

FIG. 1 is an illustration of an apparatus for performing Random Access Channel communications according to some embodiments. As illustrated in FIG. 1, a system may include a Base Station (such as an eNB or gNB) 110, including radio frequency circuitry (RF) 115 and other elements. The system further includes a User Equipment (UE) 150 (such as UE 800 illustrated in FIG. 8), including RF circuitry 155, baseband circuitry 160 including one or more baseband processors 170 (such as the baseband circuitry 804 including baseband processors 804A-804C illustrated in FIGS. 8 and 9), the baseband processors include random access channel (RACH) processing, and a memory 180 to store preambles and messages for communications and to store a common ID for the UE.

In certain circumstances, such as described above, the UE is to initiate communications with the Base Station over a Random Access Channel (RACH) 125. However, the UE may be competition with other devices for the RACH, potentially resulting in collision of signals.

Figure 4:
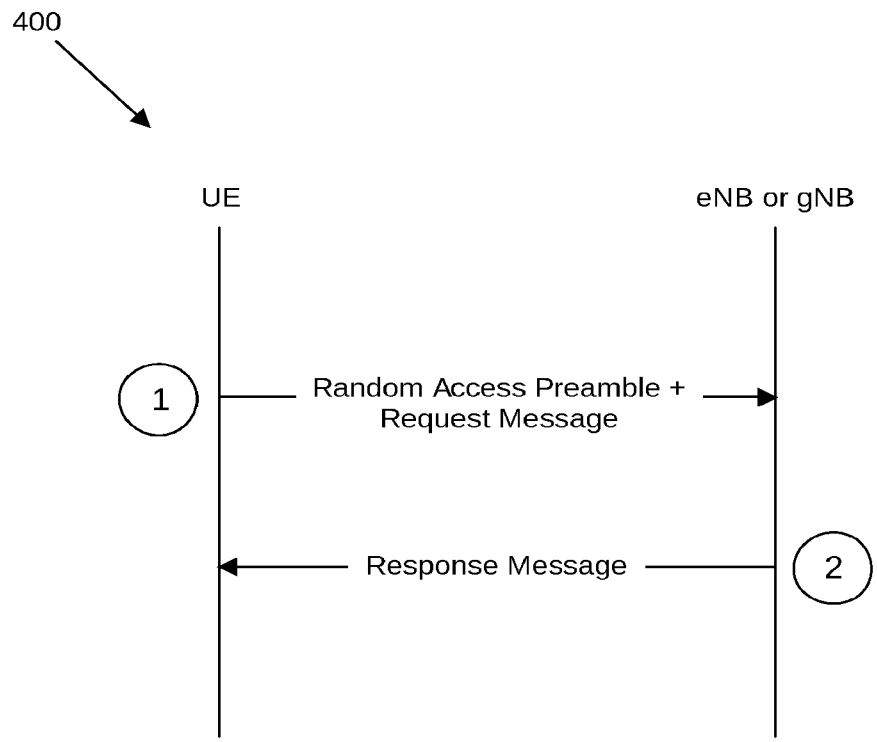
FIG. 4 illustrates a two-message RACH procedure for communication between a UE and an eNB or gNB according to some embodiments.
Figure 5:
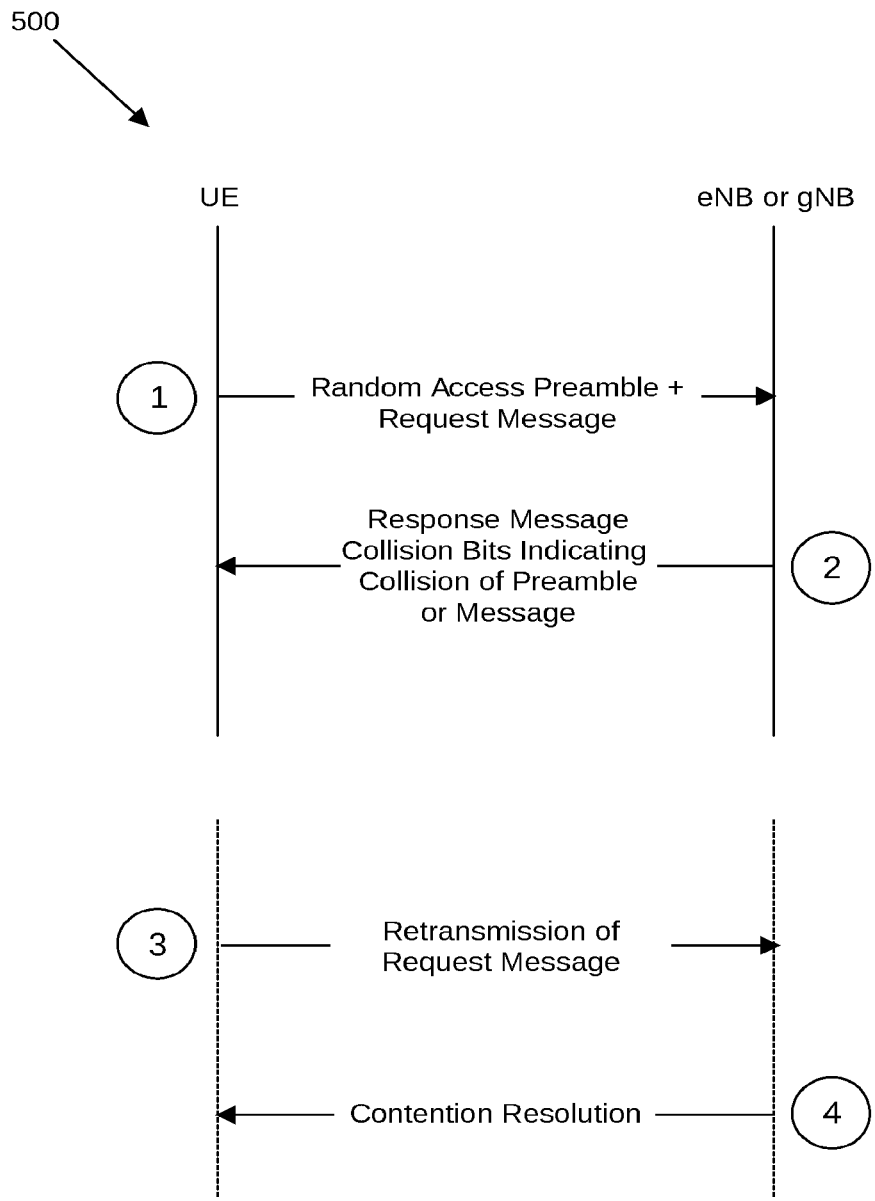
FIG. 5 illustrates a two-message RACH procedure for communication between a UE and an eNB or gNB with fall back for message collision according to some embodiments.

In some embodiments, the baseband circuitry includes a RACH communications element 170, wherein the element provides for an improved RACH procedure. In some embodiments, the RACH procedure is a common procedure for handling contention resolution processes. In some embodiments, the common RACH procedure is implemented by providing a common UE identification and contention resolution procedure. In some embodiments, the common procedure may utilize a reduced number of communications for establishment of RACH communications, wherein the RACH procedure between the UE 150 and the base station 110 is a two-message procedure as illustrated in FIG. 4. In some embodiments, the RACH procedure utilizes different time or frequency for preamble and message, thereby enabling a same collision resolution with a two-message RACH procedure as with a four-message RACH procedure, while allowing fall back to the four-message RACH, as illustrated in FIG. 5, if required.

Figure 2:
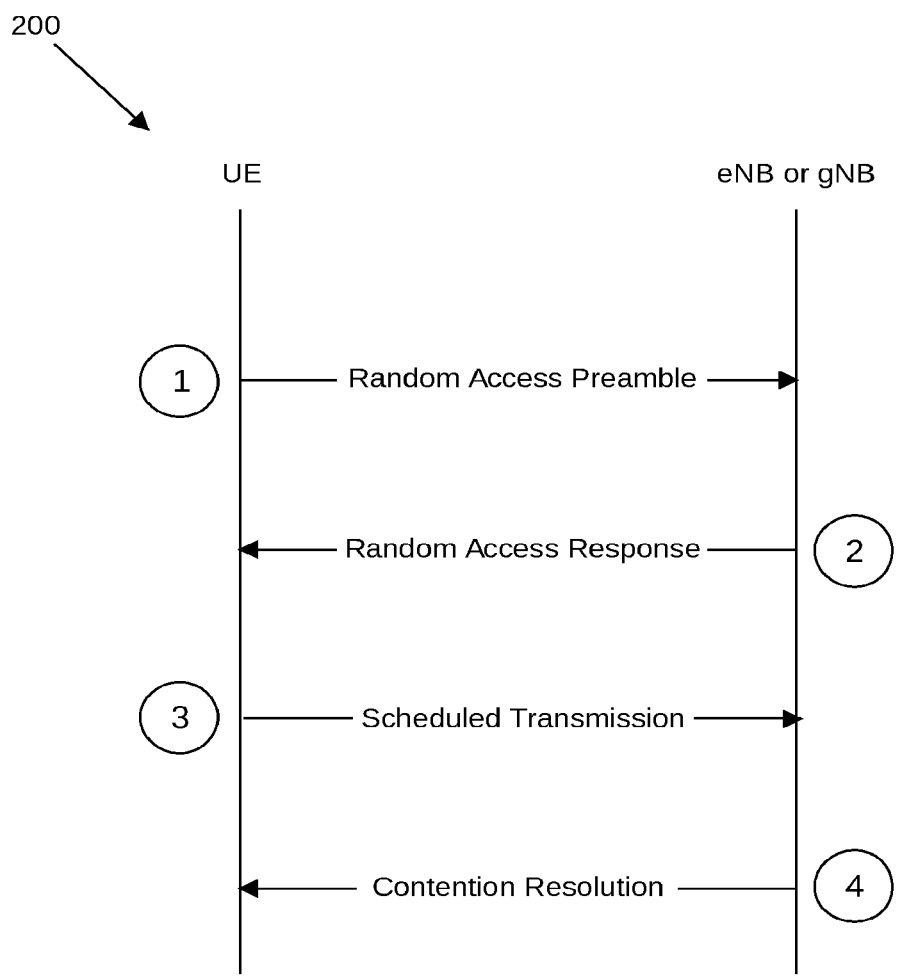
FIG. 2 illustrates a RACH procedure for communication between a UE and an eNB or gNB.

FIG. 2 illustrates a RACH procedure for communication between a UE and an eNB or gNB. As shown in FIG. 2, the contention based RACH procedure includes the following four messages between a UE and an eNB or gNB:

(1) Msg1—Communication from UE to eNB or gNB with random access preamble.

(2) Msg2—Communication from eNB or gNB to UE with random access response.

(3) Msg3—Communication from the UE to the eNB or gNB with the scheduled transmission content data.

(4) Msg4—Communication from the eNB or gNB to the UE with contention resolution data.

The above contention based random access procedure can be classified into two cases:

Case 1: In the scenarios of initial access to the RACH by the UE, Radio Resource Control (RRC) connection re-establishment, resume, and RAN paging area update, the UE identification (ID) is sent together with a RRC message in Msg3.

Case 2: In the scenarios of UE initiated uplink (UL) data being available when the UE is UL out-of-sync in RRC_Connected/NR RRC Active State, scheduling request (SR) transmission, and small UL data transmission in NR RRC Inactive State, the UE ID is either sent alone or together with a user data in Msg3.

In conventional LTE network operation, Case 1 and Case 2 require two different mechanisms or processes to perform the contention resolution:

(1) Case 1 requires taking x bits of the UL common control channel (CCCH) service data units (SDUs) (wherein the UE ID is sent in the UL CCCH SDU) to send back to the UE in Msg4.

(2) Case 2 requires echoing the cell radio network temporary identifier (C-RNTI) that was sent by UE upon Msg3 as part of the media access control (MAC) control element (CE) in Msg4.

With the addition of small UL data transmission in the NR-RRC inactive state for 5G NR, the UE may move within an area that is bigger than a cell (for example, a tracking area, or gNB assigned areas consisting of a list of cells, etc.). In such a case, the C-RNTI might not be sufficient to be used for contention resolution and UE context identification. For this reason, a more global UE ID (referred to herein generally as a common UE ID) is needed to allow UL data transmission in Msg3, and this would require another Media Access Control (MAC) Control Element (CE) type in Msg3 and Msg4.

In future development, there may further be detection of a UE specific Demodulation Reference Signal (DMRS) in the Msg3 transmission as the UE identification. If the C-RNTI associated with the detected UE specific DMRS is available, the contention resolution can be performed via the C-RNTI Physical Downlink Control Channel (PDCCH). If the C-RNTI is not available or cannot be used (such as in circumstances in which the UE has moved out of the serving cell that provided the C-RNTI), then some other associated UE ID would be needed for contention resolution.

In some embodiments, a common UE identification and contention resolution process is provided to perform contention resolution and UE context identification in each possible case. In some embodiments, the common approach for all applicable cases (including UL data transmission for an RRC Inactive State in Msg3 on top of Case 1 and 2 in Section 1) includes applying a common UE ID format at the media access control (MAC) layer in Msg3 (as illustrated in FIG. 2) for contention based random access, and echoing back the common UE-ID format back at the MAC layer in Msg4 for contention resolution. In some embodiments, the UE-ID format is a MAC CE (MAC Control Element). In some embodiments, the common UE identification and contention resolution process is also applicable to the two-message process illustrated in FIG. 4, including applying the common UE ID format at the MAC layer in Msg1 (as illustrated in FIG. 4) for contention based random access, and echoing back the common UE-ID format back at the MAC layer in Msg2 for contention resolution.

In some embodiments, regardless of how the UE ID is sent in Msg3 in FIG. 2 or Msg1 in FIG. 4, the contention resolution at the MAC layer is always to be done via the Contention Resolution ID MAC CE (i.e., taking x bits of the Msg3 (or Msg1) to send back to the UE in Msg4 (or Msg2)).

In some embodiments of an apparatus, system, or process, it is assumed herein:

(1) For any form of a UE ID that is used, wherein the UE ID may be defined similarly to LTE UE IDs (such as C-RNTI or system architecture evolution (SAE)-temporary mobile subscriber identity (S-TMSI)) or may be a random value, a resume ID, or a new form of UE ID that allows the network to uniquely identify the UE access stratum (AS) context, the network node is aware of where the UE AS context is stored and is capable of authenticating the UE.

(2) The mechanism is utilized in circumstances in which the UE needs to start initial access to the random access channel. Procedures that might use this mechanism include (a) transferring a UE from INACTIVE to CONNECTED status, (b) triggering a RAN location area update, (c) re-establishment of an RRC connection due to a radio link failure (RLF), and (d) cell update, if this mechanism were used by UEs in CONNECTED state when performing UE-based mobility mechanism.

Figure 3A:
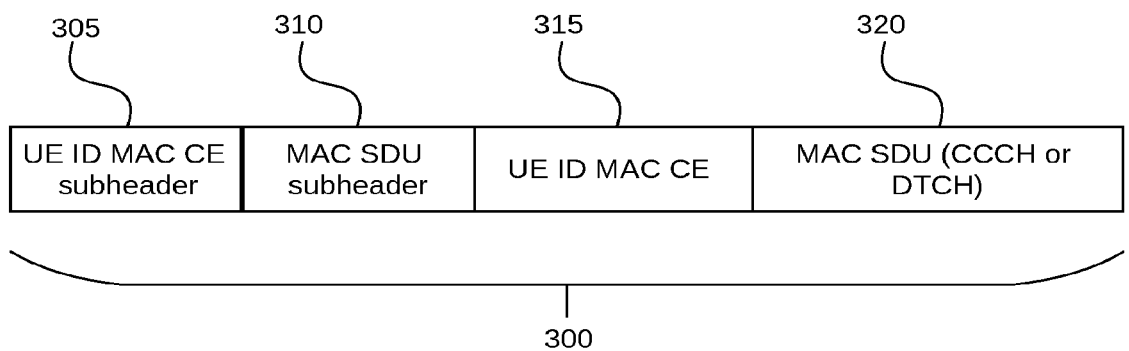
FIGS. 3A and 3B are illustrations of UE identification message formats according to some embodiments.
Figure 3B:
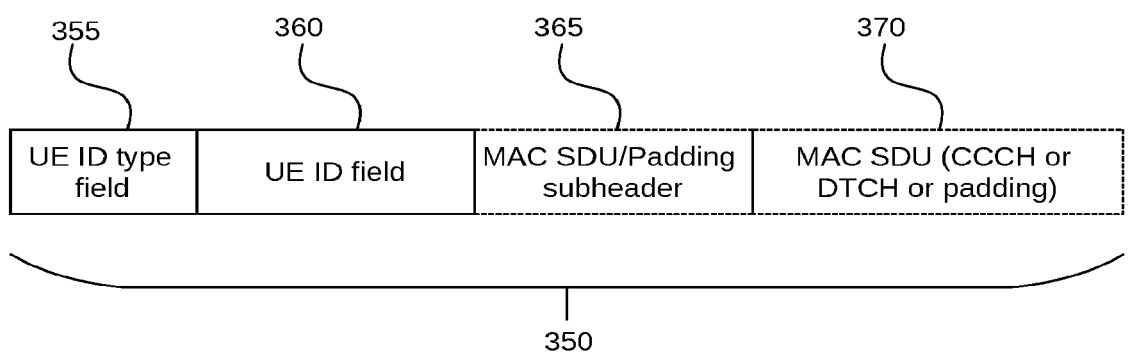

FIGS. 3A and 3B are illustrations of UE identification message formats according to some embodiments. In some embodiments, a common UE ID format for a first RACH procedure message (the first RACH procedure message being Msg3 as illustrated in FIG. 2, or Msg1 as illustrated in FIG. 4) may include the one of the following alternatives:

(1) As illustrated in FIG. 3A, the request message 300 in the RACH procedure to be transmitted may include the UE ID in the first RACH procedure message as a MAC CE. In some embodiments, message 300 includes a UE ID MAC CE subheader 305, a MAC SDU subheader 310, a UE ID MAC CE 315, and a MAC SDU (common control channel (CCCH) or dedicated control channel (DTCH)) 320.

(2) As illustrated in FIG. 3B, the request message 350 in the RACH procedure to be transmitted may include the UE ID in the first RACH procedure message as a field within the MAC PDU. In some embodiments, message 450 includes a UE ID type field 355 and a UE ID field 360, and may further include a MAC SDU or padding subheading 365 and a MAC SDU (CCCH, DTCH, or padding) 370.

Alternative (1) illustrated in FIG. 3A would imply the inclusion of an extra x-bits, such as for example at least extra 8 bits for the MAC CE subheader. However, such bits can be used to indicate the UE ID type.

Alternative (2) illustrated in FIG. 3B does not include the extra MAC overhead provided in Alternative (1). For Alternative (2), a new field 360 with fixed size may be defined to include the UE ID. However, if the UE ID could be sent more than one time with same or different lengths, it may be advantageous that, in order to identify UE ID (e.g. C-RNTI, S-TMSI, Random value, Resume ID, etc.), a UE ID type field 355 is also included (as part of the UE ID field) to allow having different kinds of UE IDs that could be included with different lengths. Alternatively, the UE, upon sending Msg1, could indicate implicitly (e.g., depending on the RACH preamble configuration or partitioning used) the kind of UE ID to be sent later in Msg3.

In some embodiments, upon receiving the UE ID in the first RACH message via the MAC, the apparatus, system, or process enables the network to find the UE AS context associated with the UE, which may further include the UE RRC Context, UE PDCP Context, and UE AS Security Context associated with this given UE.

In some embodiments, regardless of which alternative is implemented for the UE identification message format, for the purposes of contention resolution alternatives may include:

(1) The MAC in the second RACH message to echo back the UE ID from the first RACH message as part of the Contention Resolution ID MAC CE (i.e. taking x bits of the Msg3 into the MAC CE); or (2) The MAC to echo the common UE ID format from the first RACH message back to the UE in the second RACH message.

In some embodiments, for UE identification at the RRC or MAC, the MAC at the eNB or gNB can provide its RRC layer with the UE ID in the second RACH message as a primitive if the second RACH message consists also of UL CCCH SDU.

In the case that a UE specific demodulation reference signal (DMRS) is used in a first RACH message transmission:

(1) For contention resolution, wherein the associated C-RNTI is available and still valid because the UE is still in the serving cell where the C-RNTI has been allocated, the contention resolution can still be achieved via C-RNTI PDCCH.

(2) For circumstances in which the associated C-RNTI is not available or is not valid because the UE has moved out of the serving cell where the C-RNTI is allocated, a MAC CE containing a common (more global) UE ID needs to be sent to the UE for contention resolution. As for UE identification at the RRC or MAC, the associated C-RNTI can be used to identify the UE if the UE is still within the serving cell. Otherwise, the DMRS detected is to identify an expanded UE ID in the network.

In some embodiments, the contention-based RACH procedure may be further enhanced by reducing the number of messages generally required from the four messages, as illustrated in FIG. 2, to two messages. In some embodiments, the common UE identification and contention resolution process may also be applied to the two-message RACH procedure illustrated in FIG. 4, wherein the first RACH message in the common UE identification and contention resolution process refers to Msg1 in FIG. 4 and the second RACH message in the common UE identification and contention resolution process refers to the Msg2 in FIG. 4.

FIG. 4 illustrates a two-message RACH procedure for communication between a UE and an eNB or gNB according to some embodiments. As shown in FIG. 4, the contention based RACH procedure 400 includes the following two messages:

(1) Msg1—Communication from UE to eNB or gNB with UE ID, random access preamble, and request message with scheduled transmission content data.

(2) Msg2—Communication from eNB or gNB to UE with random access response.

In some embodiments, an apparatus, system, or process provides a two-message RACH procedure, wherein Msg1 and Msg3 from the four-communication RACH procedure illustrated in FIG. 2 are combined into a single RACH procedure message from the UE to the eNB or gNB, and Msg2 and Msg4 from the four-communication RACH procedure illustrated in FIG. 2 are combined into a single RACH procedure message from the eNB or gNB to the UE illustrated in FIG. 2. In some embodiments, the two-message RACH procedure provides a common approach that is applicable for each of the circumstances in which the RACH procedure is required, and may provide a same collision contention probability as the four-communication RACH procedure illustrated in FIG. 2.

In some embodiments, information is provided in Msg1 in the process 400 illustrated in FIG. 4 while maintaining a same collision contention probability as the process illustrated in FIG. 2. In some embodiments, a System Information Block (SIB) is to indicate separate resources (time/frequency) for preamble and message. (In general system information elements are broadcast in SIBs. An SIB groups together system information elements of a same nature. Different system information blocks may have different characteristics, e.g. regarding their repetition rate and the requirement on UE to re-read the system information blocks.) In some embodiments, in circumstances in which only the request messages collide, and not random access preambles, a default Msg3 size will be provided.

An issue to be addressed in combining Msg1 and Msg3 into a single message Msg1 is that there is a possibility of losing both the random access preamble and the request message in a contention circumstance. The cases that may occur with regard to collision of random access preambles and request messages are the following:

(1) Case-1—Collision in neither random access preamble nor request message.

(2) Case-2—Collision of only the request message and not the random access preamble.

(3) Case-3—Collision of the random access preamble only; and (4) Case-4—Collision of both the request message and the random access preamble.

In some embodiments, the outcomes in a RACH procedure are as described in Table 1:

TABLE 1

Collisions in RACH Procedure

| Case | Collision | Outcome |
| --- | --- | --- |
| Case-1 | No Collision | No problems have occurred; RACH procedure successful |
| Case-2 | Message Only | Fall back to 4-msg RACH procedure; retransmit message |
| Case-3 | Preamble Only | Perform contention resolution |
| Case-4 | Both Preamble and Message | |

In Case-1, no problems have occurred, and the RACH procedure will be successful, if there are no other issues.

In Case-2, as there is a collision in the request message only (Case-2), a fall back to the 4-message RACH procedure may be provided, wherein the UE knows there is a collision from the received Msg2 and can send the request message again in Msg3.

Case-3 and Case-4 will require collision resolution because the random access preamble has collided. Case 3 occurs where multiple UEs choose a different preamble, but carry the request message along in Msg1, with the request message colliding but not the random access preamble. In such case, the network can identify the UEs with different preambles but will not be able to read the request message because of the collision. In this case, that network is to send a default Msg3 size value, and fall back to the legacy or default RACH process. In Case-3 and Case-4, with the random access preamble collision, the result depends on which UE is closer to the eNB or gNB, wherein the closer UE will win and the UE that is farther from the eNB or gNB will lose in the contention.

In some embodiments, an apparatus, system, or process is to utilize a different time, frequency, or both for the random access preamble and the request message to enable the same collision resolution with the 2-message RACH procedure illustrated in FIG. 4 as with the 4-message RACH procedure illustrated in FIG. 2. In some embodiments, if there is a collision in the request message only (Case-2), the apparatus, system, or process is to fall back to the 4-message RACH, wherein the UE knows there is a collision from Msg2 and can send again in Msg3, as illustrated in FIG. 5.

FIG. 5 illustrates a two-message RACH procedure for communication between a UE and an eNB or gNB with fall back for message collision according to some embodiments. As shown in FIG. 5, the contention based RACH procedure 500 includes the following two messages:

(1) Msg1—Communication from UE to eNB or gNB with random access preamble and request message.

(2) Msg2—Communication from eNB or gNB to UE with random access response. In some embodiments, the random access response may include collision bits to indicate whether there has been a collision in the random access preamble, in the request message, or both. In some embodiments, the collision bits may include a first collision bit to indicate a collision in the random access preamble and a second collision bit to indicate a collision in the request message.

In a circumstance in which there is a collision in the request message only, the contention based RACH procedure 500 includes the following two messages:

(3) Msg3—Communication from UE to eNB or gNB, wherein the communication includes retransmission of the request message for a collision in the request message.

(4) Msg4—Communication from the eNB to the UE, wherein the communication includes with contention resolution data if required.

In some embodiments, an apparatus, system, or process is to provide the following in random access contention:

(1) Different resources in time or frequency are provided for the random access preamble and the request message in Msg1 in the RACH procedure. In some embodiments, the resources are broadcast via the System Information Block (SIB).

(2) With regard to a collision on the request message only, the Random Access Response (RAR) response indicates either that there is a collision in the request message only or that there is no collision on the request message.

(3) If there is a collision on the request message only, resulting in fallback to the 4-message RACH procedure, the Msg3 is either a default Msg3 size or is a size that the network allocates in the RAR.

Embodiments herein provide a way information can be carried in Msg1 and still remain the same collision probability. Generally, embodiments may allow SIB to indicate separate resource (time/frequency) for preamble and message. When only the request message collides, a default Msg3 size will be provided.

Figure 6:
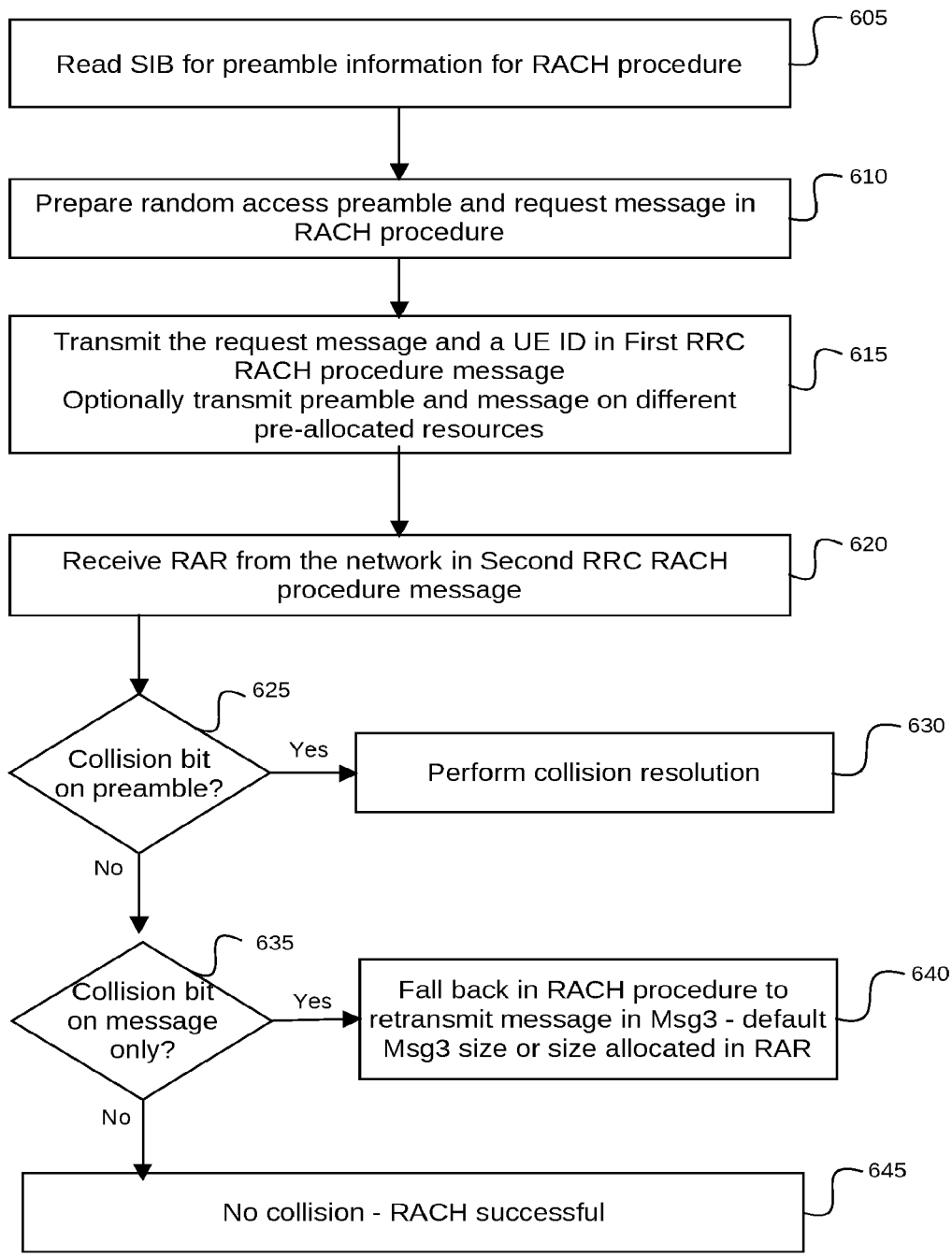
FIG. 6 is a flowchart to illustrate a process for random access channel contention resolution procedure according to some embodiments.

FIG. 6 is a flowchart to illustrate a process for a random access channel contention procedure according to some embodiments. In some embodiments, a process includes:

605: The UE reads SIB to obtain preamble information for a RACH procedure.

610: The UE prepares preamble and message for the RACH procedure. In some embodiments, the RACH procedure is a common procedure for handling contention resolution for each of a plurality of random access scenarios

615: The UE transmits the request message and UE ID in a first RRC RACH procedure message. In some embodiments, the random access preamble is transmitted on a resource allocated for the preamble, and the request message is transmitted on a different pre-allocated resource. In some embodiments, the UE ID is a common UE IE for RACH procedures with the eNB or gNB.

620: Receive Random Access Response (RAR) from the network in a second RRC RACH procedure message.

625: Determine whether a first collision bit in the second RRC RACH procedure message to indicate a collision in the random access preamble is set.

630: Upon determining the first collision bit is set (wherein there may or may not be a collision on the request message), performing a collision resolution.

635: Upon determining the first collision bit is not set, then determining if a second collision bit in the second RRC RACH procedure message to indicate a collision in the request message is set.

640: Upon determining that the second collision bit is set, retransmitting the request message in a third message.

645: Upon determining the second collision bit is not set, then no collision has occurred. The RACH procedure will then be successful, if there are no other issues.

In some embodiments, a common UE identification and contention procedure may be made as provided in the following examples:

(1) User Equipment (UE) that is configured to always send a common UE ID format in a MAC layer in a third message (Msg3), as illustrated in FIG. 5, for contention resolution and UE context identification.

(2) A network node that includes a MAC layer to, upon receipt of a common UE ID format in Msg3 from a UE, perform contention resolution by echoing back the common UE ID format to the UE in Msg4 or by sending Contention Resolution ID MAC CE (for example, taking x bits of the Msg3 into MAC CE) back to the UE in Msg4.

(3) The network node of Example 2 or other example, wherein the MAC layer is to forward the UE ID in Msg3 to an RRC layer if UE context identification is needed at the RRC layer (for example, for Resume, re-establishment etc.).

(4) The network node of Example 2 or 3 or other example, wherein the MAC layer is to use the UE ID in Msg3 to perform UE context identification to determine the routing of the user data to CN.

(5) An eNB to provide a UE-specific DMRS in Msg3 transmission, wherein contention resolution is to be performed via C-RNTI PDCCH if there is an associated C-RNTI. Otherwise, a MAC CE containing an expanded (common) UE ID may be sent.

(6) An eNB to provide a UE-specific DMRS in Msg3 transmission, wherein UE identification is to be performed via identifying the associated C-RNTI if the detected DMRS is allocated by the cell where random access is initiated. Otherwise, the detected DMRS is to identify an expanded UE ID.

(7) An apparatus comprising means to perform one or more elements of a method described herein.

(8) One or more non-transitory computer-readable media comprising instructions to cause an electronic device, upon execution of the instructions by one or more processors of the electronic device, to perform one or more elements of a method described herein.

(9) An apparatus comprising logic, modules, and/or circuitry to perform one or more elements of a method described herein.

(10) A method, technique, or process as described herein.

(11) An apparatus comprising: one or more processors and one or more computer readable media comprising instructions that, when executed by the one or more processors, cause the one or more processors to perform the method, techniques, or process as described herein.

Figure 7:
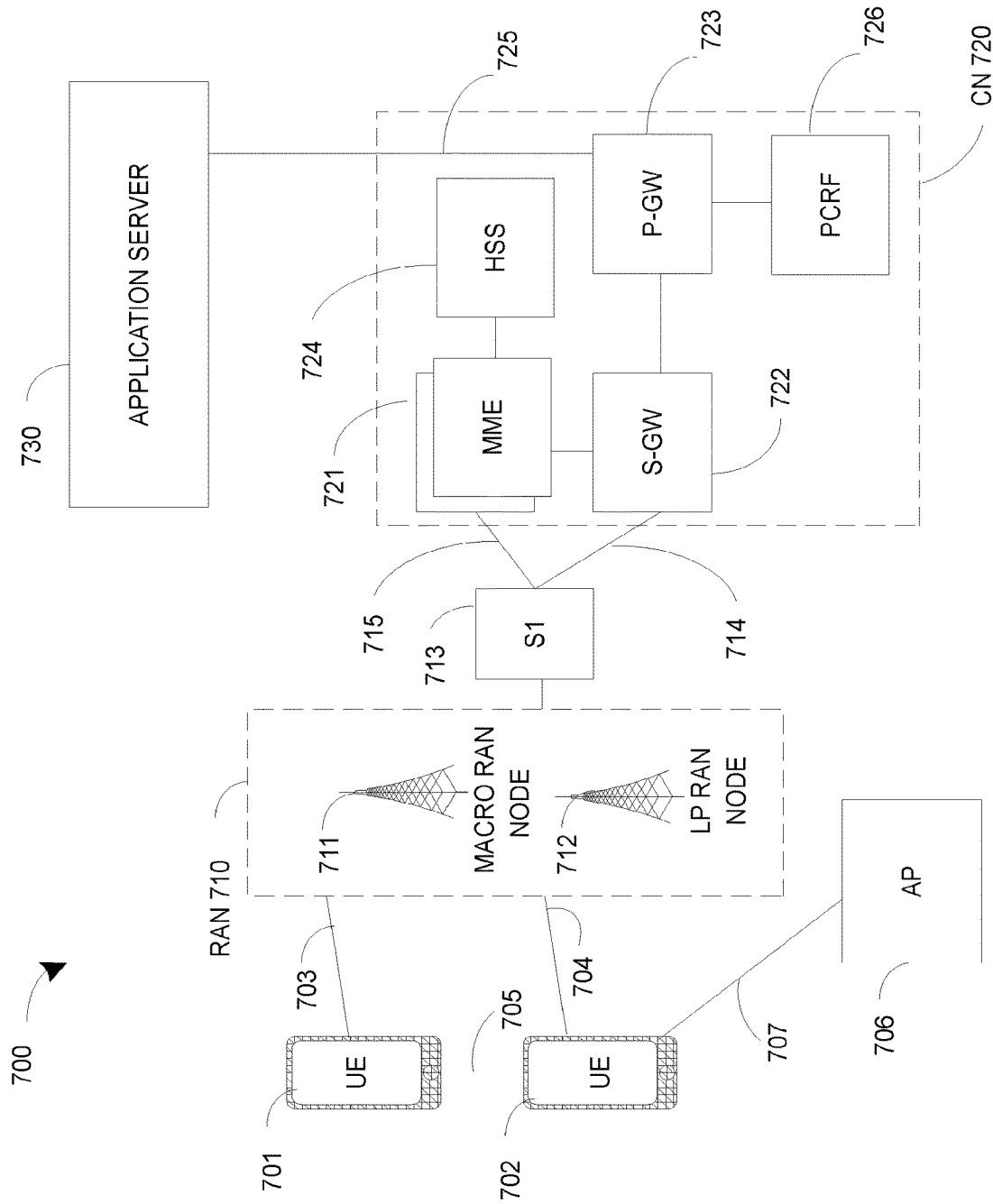
FIG. 7 illustrates an architecture of a system of a network in accordance with some embodiments.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.11 protocol, wherein the AP 706 would comprise a wireless fidelity (WiFi®) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the EPC network 723 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
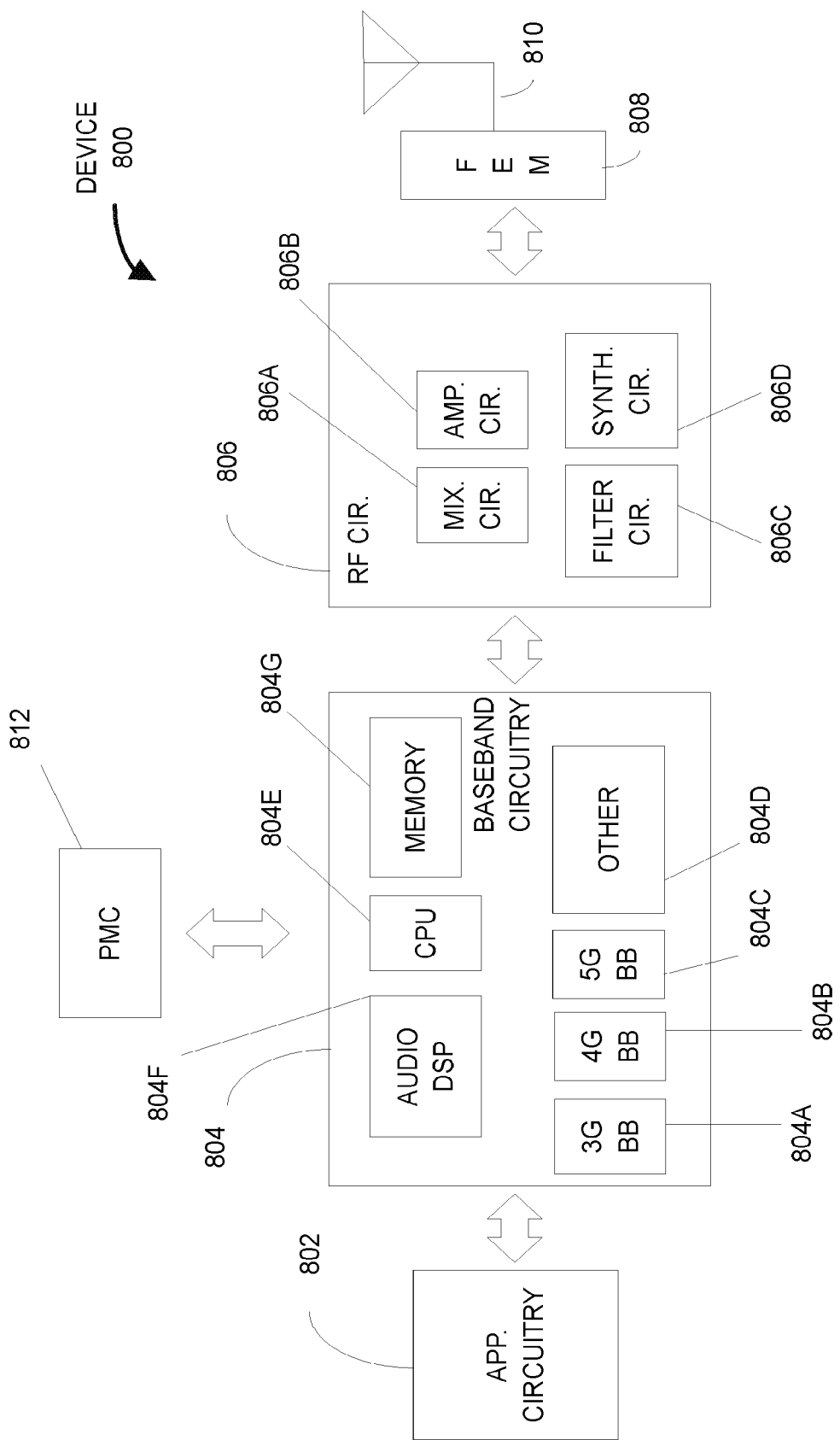
FIG. 8 illustrates example components of a device in accordance with some embodiments.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuity 804 may interface with the application circuitry 802 for generation and processing of the baseband signals and for controlling operations of the RF circuitry 806. For example, in some embodiments, the baseband circuitry 804 may include a third generation (3G) baseband processor 804A, a fourth generation (4G) baseband processor 804B, a fifth generation (5G) baseband processor 804C, or other baseband processor(s) 804D for other existing generations, generations in development or to be developed in the future (e.g., second generation (2G), sixth generation (6G), etc.). The baseband circuitry 804 (e.g., one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804F. The audio DSP(s) 804F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state; in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
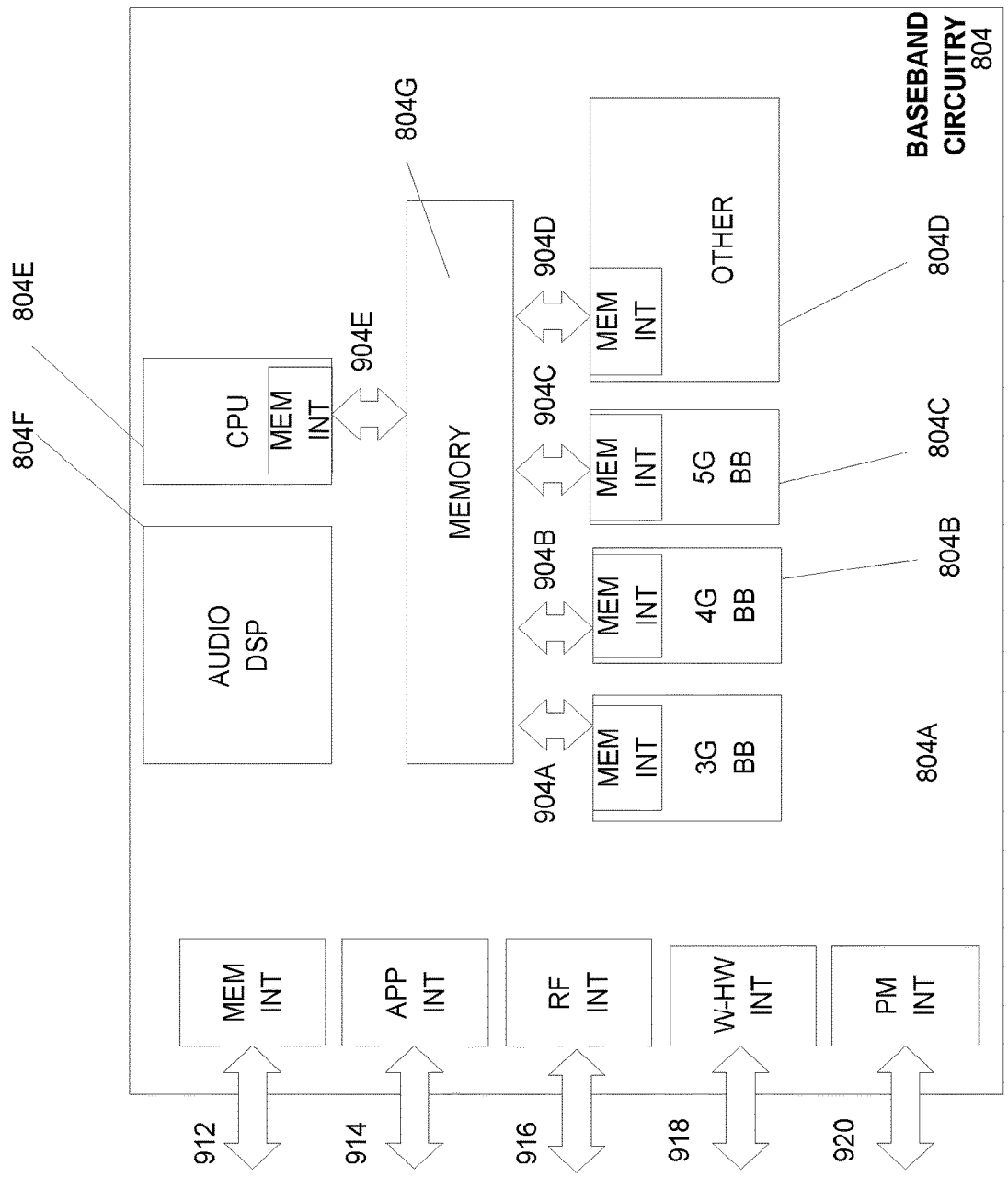
FIG. 9 illustrates example interfaces of baseband circuitry in accordance with some embodiments.

FIG. 9 illustrates example interfaces of baseband circuitry in accordance with some embodiments. As discussed above, the baseband circuitry 804 of FIG. 8 may comprise processors 804A-804E and a memory 804G utilized by said processors. Each of the processors 804A-804E may include a memory interface, 904A-904E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812).

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

In some embodiments, an apparatus for a user equipment (UE) to perform a random access channel (RACH) procedure includes: one or more baseband processors to: generate a first Radio Resource Control (RRC) RACH procedure message to transmit to an Evolved Node B (eNB) or Next Generation Node B (gNB), the first RRC RACH procedure message including a UE identification (ID) and a request message with scheduled transmission content data, the UE ID being a common UE ID for RACH procedures between the UE and the eNB or gNB, and process a second RRC RACH procedure message received from the eNB or gNB, the second RRC RACH procedure message including contention resolution data for a random access preamble and the request message; and a memory to store data for the RACH procedure.

In some embodiments, the first RRC RACH procedure message is a Msg3 in the RACH procedure and the second message is a Msg4 in the RACH procedure, the one or more baseband processors further to: generate a Msg1 to transmit to the eNB or gNB, Msg1 including the random access preamble; and process a Msg2 from the eNB or gNB, Msg2 including a random access response (RAR).

In some embodiments, the first RRC RACH procedure message is a Msg1 in the RACH procedure and the second RRC RACH procedure message is a Msg2 in the RACH procedure: the first RRC RACH procedure message further includes the random access preamble to transmit to the eNB or gNB; and the second RRC RACH procedure message further includes a random access response (RAR).

In some embodiments, the RACH procedure is a common process for handling contention resolution for each of a plurality of random access scenarios.

In some embodiments, the plurality of random access scenarios includes: initial access to the RACH by the UE, RRC connection re-establishment, resume, and radio access network (RAN) paging area update; and UE initiated uplink (UL) data being available when the UE is UL out-of-sync in RRC connected/new radio (NR) RRC active state, scheduling request (SR) transmission, and small UL data transmission in NR RRC inactive state.

In some embodiments, the one or more baseband processors are to utilize separate resources in time, frequency, or both for the random access preamble and the request message.

In some embodiments, the UE ID includes one of the following formats: a UE ID media access control (MAC) control element (CE) subheader and UE ID MAC CE; or a UE ID type field and a UE ID field.

In some embodiments, the contention resolution includes: echoing back x-bits of the UE ID in the second RRC RACH procedure message utilizing the format of the UE ID in the first RRC RACH procedure message.

In some embodiments, a media access control (MAC) layer provides the UE ID in the first RRC RACH procedure message to an RRC layer as a primitive.

In some embodiments, the second RRC RACH procedure message includes a plurality of collision bits, the plurality of collision bits including: a first collision bit indicating a collision in the random access preamble; and a second collision bit indicating a collision in the request message.

In some embodiments, a computer-readable storage medium having stored thereon data representing sequences of instructions that, when executed by a processor, cause the processor to perform operations including: preparing a random access preamble and a request message for a random access channel (RACH) procedure with an Evolved Node B (eNB) or Next Generation Node B (gNB); transmitting a first Radio Resource Control (RRC) RACH procedure message to the eNB or gNB, the first RRC RACH procedure message including a UE identification (ID) and a request message with scheduled transmission content data the UE ID being a common UE ID for RACH procedures between the UE and the eNB or gNB; and receiving a second RRC RACH procedure message from the eNB or gNB, the second RRC RACH procedure message including contention resolution data for the random access preamble and the request message.

In some embodiments, the first RRC RACH procedure message is a Msg3 in the RACH procedure and the second message is a Msg4 in the RACH procedure, and further comprising instructions that, when executed by the processor, cause the processor to perform operations including: transmitting a Msg1 to the eNB or gNB, Msg1 including the random access preamble; and receiving a Msg2 from the eNB or gNB, Msg2 including a random access response (RAR).

In some embodiments, the first RRC RACH procedure message is a Msg1 in the RACH procedure and the second RRC RACH procedure message is a Msg2 in the RACH procedure; the first RRC RACH procedure message further includes the random access preamble to transmit to the eNB or gNB; and the second RRC RACH procedure message further includes a random access response (RAR).

In some embodiments, the medium further includes instructions for reading a system information block (SIB) to obtain preamble information for the RACH process.

In some embodiments, the medium further includes instructions for determining whether a first collision bit in the second RRC RACH procedure message to indicate a collision in the random access preamble is set; and upon determining the first collision bit is set, performing a collision resolution.

In some embodiments, the medium further includes instructions for determining whether a second collision bit in the second RRC RACH procedure message to indicate a collision in the request message is set; and upon determining the second collision bit is set, retransmitting the request message in a third RRC RACH procedure message.

In some embodiments, transmitting the first RRC RACH procedure message to the eNB or gNB includes utilizing separate resources in time, frequency, or both for the random access preamble and the request message.

In some embodiments, the UE ID includes: a UE ID media access control (MAC) control element (CE) subheader and UE ID MAC CE; or a UE ID type field and a UE ID field.

In some embodiments, the contention resolution includes: echoing back x-bits of the UE ID in the second RRC RACH procedure message utilizing the format of the UE ID in the first RRC RACH procedure message.

In some embodiments, a media access control (MAC) layer provides the UE ID in the first RRC RACH procedure message to an RRC layer as a primitive.

In some embodiments, an apparatus includes means for preparing a random access preamble and a request message for a random access channel (RACH) procedure with an Evolved Node B (eNB) or Next Generation Node B (gNB); means for transmitting a first Radio Resource Control (RRC) RACH procedure message to the eNB or gNB, the first RRC RACH procedure message including a UE identification (ID) and a request message with scheduled transmission content data, the UE ID being a common UE ID for RACH procedures between the UE and the eNB or gNB; and means for receiving a second RRC RACH procedure message from the eNB or gNB, the second RRC RACH procedure message including contention resolution data for the random access preamble and the request message.

In some embodiments, the first RRC RACH procedure message is a Msg3 in the RACH procedure and the second message is a Msg4 in the RACH procedure, and the apparatus further includes means for transmitting a Msg1 to the eNB or gNB, Msg1 including the random access preamble; and receiving a Msg2 from the eNB or gNB, Msg2 including a random access response (RAR).

In some embodiments, the first RRC RACH procedure message is a Msg1 in the RACH procedure and the second RRC RACH procedure message is a Msg2 in the RACH procedure; the first RRC RACH procedure message further includes the random access preamble to transmit to the eNB or gNB; and the second RRC RACH procedure message further includes a random access response (RAR).

In some embodiments, the apparatus further includes means for reading a system information block (SIB) to obtain preamble information for the RACH process.

In some embodiments, the apparatus further includes means for determining whether a first collision bit in the second RRC RACH procedure message to indicate a collision in the random access preamble is set; and means for performing a collision resolution upon determining the first collision bit is set.

In some embodiments, the apparatus further includes means for determining whether a second collision bit in the second RRC RACH procedure message to indicate a collision in the request message is set; and upon determining the second collision bit is set, retransmitting the request message in a third RRC RACH procedure message.

In some embodiments, transmitting the first RRC RACH procedure message to the eNB or gNB includes utilizing separate resources in time, frequency, or both for the random access preamble and the request message.

In some embodiments, the UE ID includes: a UE ID media access control (MAC) control element (CE) subheader and UE ID MAC CE; or a UE ID type field and a UE ID field.

In some embodiments, the contention resolution includes: echoing back x-bits of the UE ID in the second RRC RACH procedure message utilizing the format of the UE ID in the first RRC RACH procedure message.

In some embodiments, a media access control (MAC) layer provides the UE ID in the first RRC RACH procedure message to an RRC layer as a primitive.

In some embodiments, a system for a user equipment (UE) to perform a random access channel (RACH) procedure includes: one or more baseband processors to: generate a first Radio Resource Control (RRC) RACH procedure message to transmit to an Evolved Node B (eNB) or Next Generation Node B (gNB), the first RRC RACH procedure message including a UE identification (ID) and a request message with scheduled transmission content data, the UE ID being a common UE ID for RACH procedures between the UE and the eNB or gNB, and process a second RRC RACH procedure message received from the eNB or gNB, the second RRC RACH procedure message including contention resolution data for a random access preamble and the request message; a memory to store data for the RACH procedure; a transmitter or receiver to transmit or receive signals; and an antenna for wireless signal reception and transmission.

In some embodiments, the first RRC RACH procedure message is a Msg3 in the RACH procedure and the second message is a Msg4 in the RACH procedure, the one or more baseband processors further to: generate a Msg1 to transmit to the eNB or gNB, Msg1 including the random access preamble; and process a Msg2 from the eNB or gNB, Msg2 including a random access response (RAR).

In some embodiments, the first RRC RACH procedure message is a Msg1 in the RACH procedure and the second RRC RACH procedure message is a Msg2 in the RACH procedure; the first RRC RACH procedure message further includes the random access preamble to transmit to the eNB or gNB; and the second RRC RACH procedure message further includes a random access response (RAR).

In some embodiments, the RACH procedure is a common process for handling contention resolution for each of a plurality of random access scenarios.

In some embodiments, the one or more baseband processors are to utilize separate resources in time, frequency, or both for the random access preamble and the request message.

In some embodiments, the second RRC RACH procedure message includes a plurality of collision bits, the plurality of collision bits including: a first collision bit indicating a collision in the random access preamble; and a second collision bit indicating a collision in the request message.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus for a user equipment (UE) to perform a random access channel (RACH) procedure the apparatus comprising:
    memory to store configuration information for the RACH procedure, the configuration information to configure the UE to use a common UE identification (ID) and contention resolution process for a plurality of random access scenarios that include a paging area update by the UE and an uplink (UL) data transmission when the UE is in new radio (NR) RRC inactive state and is within a tracking area or a base station (BS)-assigned area that includes a list of cells; and
    one or more baseband processors coupled with the memory to access the configuration information, the one or more baseband processors further to:
        detect a first random access scenario of the plurality of random access scenarios, the first random access scenario being the paging area update or the UL data transmission;
        generate, based on detection of the first random access scenario, a first RACH procedure message to transmit to an Evolved Node B (eNB) or Next Generation Node B (gNB), the first RACH procedure message to include the common UE ID at a media access control (MAC) layer; and
        process a second RACH procedure message received from the eNB or gNB, the second RACH procedure message to include contention resolution data based on the common UE ID and contention resolution process at the MAC layer.

2. The apparatus of claim 1, wherein the first RACH procedure message is a Msg3 in the RACH procedure and the second RACH procedure message is a Msg4 in the RACH procedure, the one or more baseband processors further to:
    generate a Msg1 to transmit to the eNB or gNB, the Msg1 to include a random access preamble; and
    process a Msg2 from the eNB or gNB, the Msg2 to include a random access response (RAR).

3. The apparatus of claim 1, wherein:
    the first RACH procedure message is a Msg1 in the RACH procedure and the second RACH procedure message is a Msg2 in the RACH procedure;
    the first RACH procedure message to further include a random access preamble to transmit to the eNB or gNB; and
    the second RACH procedure message to further include a random access response (RAR).

4. The apparatus of claim 1, wherein the plurality of random access scenarios further include: an initial access, an RRC connection re-establishment, an RRC connection resume, a scheduling request (SR) transmission, or a UE-initiated UL data transmission when the UE is UL out-of-sync in an RRC connected state or in an NR RRC active state.

5. The apparatus of claim 1, wherein the one or more baseband processors are to utilize separate resources in time, frequency, or both for a random access preamble and a request message of a Msg1 in the RACH procedure.

6. The apparatus of claim 5, wherein the second RACH procedure message includes a plurality of collision bits, the plurality of collision bits including:
    a first collision bit to indicate whether there was a collision with respect to the random access preamble; and
    a second collision bit to indicate whether there was a collision with respect to the request message.

7. The apparatus of claim 1, wherein the first RACH procedure message is to include the common UE ID in:
    a MAC control element (CE) having a UE ID MAC CE subheader and UE ID MAC CE; or
    a MAC protocol data unit (PDU) having a UE ID type field and a UE ID field.

8. The apparatus of claim 7, wherein the contention resolution process includes:
    echoing back a predetermined number of bits of the common UE ID in the second RACH procedure message utilizing a format of the common UE ID in the first RACH procedure message.

9. A computer-readable storage medium having stored thereon data representing sequences of instructions that, when executed by a processor, cause the processor to perform operations comprising:
    receiving a system information block (SIB) with an indication of first resources for a random access preamble of a Msg1 of a random access channel (RACH) procedure and second resources for a message of the Msg1;
    preparing the Msg1 to include the random access preamble and the message;
    transmitting the Msg1 using the first and second resources for the random access preamble and the message, respectively;
    receiving a Msg2 of the RACH procedure from an Evolved Node B (eNB) or Next Generation Node B (gNB), the Msg2 to include a first collision bit to indicate whether there was a collision with respect to the random access preamble and a second collision bit to indicate whether there was a collision with respect to the message; and
    determining whether to perform a collision resolution and a size of a Msg3 of the RACH procedure based on the first and second collision bits.

10. The medium of claim 9, further comprising instructions that, when executed by the processor, cause the processor to perform operations comprising:
    determining that the first collision bit in the Msg2 indicates there was a collision with respect to the random access preamble; and
    upon determining the first collision bit indicates there was a collision with respect to the random access preamble, performing the collision resolution.

11. The medium of claim 9, further comprising instructions that, when executed by the processor, cause the processor to perform operations comprising:
    determining that the second collision bit in the Msg2 indicates there was a collision with respect to the message; and
    upon determining the second collision bit indicates there was a collision with respect to the message, determining a default size is to be used for the Msg3 of the RACH procedure; and transmitting the Msg3 with the default size.

12. The medium of claim 9, wherein the first and second resources include different time resources, frequency resources, or both.

13. A method of performing a random access channel (RACH) procedure with a user equipment (UE), the method comprising:
    storing configuration information for the RACH procedure, the configuration information to configure the UE to use a common UE identification (ID) and contention resolution process for a plurality of random access scenarios that include a paging area update by the UE and an uplink (UL) data transmission when the UE is in new radio (NR) RRC inactive state and is within a tracking area or a base station (BS)-assigned area that includes a list of cells;
    detecting a first random access scenario of the plurality of random access scenarios, the first random access scenario being the paging area update or the UL data transmission;
    generating, based on detecting the first random access scenario, a first RACH procedure message to transmit to an Evolved Node B (eNB) or Next Generation Node B (gNB), the first RACH procedure message to include the common UE ID at a media access control (MAC) layer; and
    processing a second RACH procedure message received from the eNB or gNB, the second RACH procedure message to include contention resolution data based on the common UE ID and contention resolution process at the MAC layer.

14. The method of claim 13, wherein the first RACH procedure message is a Msg3 in the RACH procedure and the second RACH procedure message is a Msg4 in the RACH procedure, and the method further comprises:
    generating a Msg1 to transmit to the eNB or gNB, the Msg1 to include a random access preamble; and
    processing a Msg2 from the eNB or gNB, the Msg2 to include a random access response (RAR).

15. The method of claim 13, wherein:
    the first RACH procedure message is a Msg1 in the RACH procedure and the second RACH procedure message is a Msg2 in the RACH procedure;
    the first RACH procedure message to further include a random access preamble to transmit to the eNB or gNB; and
    the second RACH procedure message to further include a random access response (RAR).

16. The method of claim 3, wherein the plurality of random access scenarios further include: an initial access, an RRC connection re-establishment, an RRC connection resume, a scheduling request (SR) transmission, or a UE-initiated UL data transmission when the UE is UL out-of-sync in an RRC connected state or in an NR RRC active state.

17. The method of claim 13, further comprising: utilizing separate resources in time, frequency, or both for a random access preamble and a request message of a Msg1 in the RACH procedure.

18. The method of claim 17, wherein the second RACH procedure message includes a plurality of collision bits, the plurality of collision bits including:
    a first collision bit to indicate whether there was a collision with respect to the random access preamble; and
    a second collision bit to indicate whether there was a collision with respect to the request message.

19. The method of claim 13, wherein the first RACH procedure message is to include the common UE ID in:
    a MAC control element (CE) having a UE ID MAC CE subheader and UE ID MAC CE; or
    a MAC protocol data unit (PDU) having a UE ID type field and a UE ID field.

20. The method of claim 19, wherein the contention resolution process includes: echoing back a predetermined number of bits of the common UE ID in the second RACH procedure message utilizing a format of the common UE ID in the first RACH procedure message.

* * * * *